(12) United States Patent
Leibovitz et al.

(10) Patent No.: US 7,263,076 B1
(45) Date of Patent: Aug. 28, 2007

(54) SYSTEM AND METHOD FOR MANAGING A WIRELESS NETWORK COMMUNITY

(75) Inventors: John S. Leibovitz, New York, NY (US); Stephen D. Robinson, New Haven, CT (US)

(73) Assignee: Radiuz Networks LLC, New York, NY (US)

( * ) Notice: Subject to any disclaimer, the term of this patent is extended or adjusted under 35 U.S.C. 154(b) by 194 days.

(21) Appl. No.: 11/246,486

(22) Filed: Oct. 7, 2005

Related U.S. Application Data

(60) Provisional application No. 60/617,275, filed on Oct. 9, 2004.

(51) Int. Cl.
*H04Q 7/20* (2006.01)

(52) U.S. Cl. .................. 370/310; 370/310.2; 370/328; 370/338; 370/343; 370/349; 455/426.1; 455/426.2; 455/422.1; 455/403; 455/466; 455/414.1; 455/410; 709/229; 709/203; 709/218; 709/219; 709/228; 726/13; 726/3; 726/27

(58) Field of Classification Search ................ 370/310, 370/310.2, 328, 338, 343, 349; 455/426.1, 455/426.2, 422.1, 414.2, 414.3, 414.4, 466, 455/410, 411, 412.1, 412.2, 435.1, 435.2, 455/435.3, 500, 517, 445; 709/229, 203, 709/218, 219, 228; 726/13, 3, 27

See application file for complete search history.

(56) References Cited

U.S. PATENT DOCUMENTS

| | | | |
|---|---|---|---|
| 6,732,176 B1 | 5/2004 | Stewart | |
| 6,813,496 B2 | 11/2004 | Numminen | |
| 6,938,076 B2 | 8/2005 | Meyer | |
| 2002/0046179 A1* | 4/2002 | Kokudo | 705/51 |
| 2002/0151300 A1 | 10/2002 | Suda | |
| 2003/0169713 A1 | 9/2003 | Luo | |
| 2003/0233580 A1 | 12/2003 | Keeler | |
| 2004/0181602 A1* | 9/2004 | Fink | 709/229 |

(Continued)

OTHER PUBLICATIONS

*Enabling secure third party control on wireless home networks* Meddahi, A.; Masmoudi, K.; Afifi, H.; M'Hamed, A.; Hajjeh, I. ENIC Telecom Lille, France Conference: 2004 4th Workshop on Applications and Services in Wireless Networks (ASWN), Aug. 9-11, 2004, Boston, MA, USA , pp. 46-54 Publisher: IEEE , Piscataway, NJ, USA , 2004 , vi+232 Pages.

(Continued)

*Primary Examiner*—Keith Ferguson
(74) *Attorney, Agent, or Firm*—Pinnacle Patent Law Group

(57) ABSTRACT

A wireless network community includes a plurality of wireless access points associated with a plurality of owners and a community management system in communication with each of the plurality of wireless access points via an Internet. The community management system includes a web server for interacting with the owners and for allowing each of the owners to register as a member of the network community. The community management system also includes an authentication server, and a data store coupled to the web server and to the authentication server. The community management system is configured to allow each registered member to register an associated wireless access point and to control which of the other members is authorized to access the wireless access point.

24 Claims, 8 Drawing Sheets

U.S. PATENT DOCUMENTS

| | | |
|---|---|---|
| 2004/0203740 A1 | 10/2004 | Won |
| 2004/0260760 A1 | 12/2004 | Cumyn |
| 2005/0048950 A1 | 3/2005 | Morper |
| 2005/0080884 A1 | 4/2005 | Siorpaes |
| 2005/0086346 A1 | 4/2005 | Meyer |
| 2005/0114680 A1 | 5/2005 | Chinnaswamy |
| 2005/0148321 A1 | 7/2005 | Igarashi |
| 2005/0164704 A1 | 7/2005 | Winsor |
| 2005/0198534 A1 | 9/2005 | Matta |
| 2007/0124802 A1* | 5/2007 | Anton et al. .................. 726/3 |

OTHER PUBLICATIONS

*Wireless community networks* Saurabh Jain; Agrawal, D.P. Dept. of Electr. & Comput. Eng. & Comput. Sci., Cincinnati Univ., OH, USA Computer , vol. 36, No. 8 , p. 90-92 Publisher: IEEE Comput. Soc, Aug. 2003.

* cited by examiner

SYSTEM AND METHOD FOR MANAGING A WIRELESS NETWORK COMMUNITY

CROSS-REFERENCE TO RELATED APPLICATIONS

This application claims priority to a provisional application entitled, "System and Methods for Controlling Access to a Cooperative Wireless Network," Ser. No. 60/617,275, filed Oct. 9, 2004, which is herein incorporated in its entirety by reference.

FIELD OF THE INVENTION

The present invention relates to wireless communication systems, and more particularly to a system and method for managing a cooperative wireless network community that includes a plurality of wireless access points owned by a plurality of owners.

BACKGROUND OF THE INVENTION

Traditionally, cables have been used to connect devices, e.g., desktop computers, printers, modems, and servers, to one another to form a local area network (LAN). In a LAN, the networked devices are able to communicate with one another and to share information. If the LAN is connected to the Internet, the networked devices can access the Internet as well.

With the advent of wireless technology, suitably enabled devices can connect to a LAN without physically connecting to the network, thereby forming a wireless LAN (WLAN). Here, each device is equipped with a wireless communication card or an embedded wireless communication module that allows the device to send and receive data transmissions to and from a wireless access point (AP). The AP is typically attached to the wired LAN and can include a router so that it also provides a gateway to the Internet.

Typical APs that are commercially available can communicate simultaneously with several devices (or clients) within a certain range. Within that range, the user of the client enjoys a full network connection with the benefit of mobility. The AP's range is typically a radius of approximately 45 m (indoors) to approximately 100 m (outdoors), but that can be affected by a number of factors, such as, e.g., the location of the AP, nearby obstructions, type of antenna, and power output of the AP. Accordingly, in general, the AP's range is limited to a relatively small area, such as a room, house, or building. To increase the coverage area, additional APs can be connected together to form a larger WLAN, but this can be costly for a typical home consumer. Complicating factors involve setting up the correct parameters on similar devices or connecting potentially incompatible devices from different manufacturers. Moreover, it is difficult for different people who own APs to coordinate the complicated task of linking their separate APs into a larger network.

Most commercially available APs are equipped to provide network security by incorporating a Wi-Fi Protected Access (WPA) encryption protocol to protect the wireless LAN from unauthorized devices. WPA is designed for use with an IEEE 802.1x authentication server, which distributes, and periodically changes, different keys to each authorized user. For home and small office networks that cannot afford the cost and complexity of the 802.1x authentication server, WPA can also be used in a less secure "pre-shared key" (PSK) mode, where every authorized user is given a passphrase which must be entered before being allowed to access the network. Selecting and managing the passphrase can be a tedious burden for the user, particularly if more than one authorized user exists. The problem is exacerbated when the AP owner wants to change access privileges for multiple users over time, as removing access for one user may require distributing a new passphrase to every other user. It has also been noted in the literature that WPA-PSK passphrases of limited size can lead to the deciphering of the encrypted traffic, thus rendering this mode of security vulnerable to attack.

As stated above, a WLAN's range or coverage area is somewhat limited to the vicinity of the wireless access point(s). Within that coverage area, an authorized wireless device can enjoy the benefits of the network, including Internet access. Outside of the coverage area, unless the wireless device is authorized to use other WLANs, the device is generally not allowed to access other private WLANs. Thus, the wireless aspects of the device are effectively useless outside of the authorized WLAN.

Wireless network owners are thus faced with a paradox. If they wish to participate in an open community of wireless access, they may leave their APs unsecured. However, this decision also leaves them unprotected and exposed to harmful or illegal use of their wireless networks by unscrupulous users. Moreover, they have no guarantee that other AP owners will similarly feel inclined to share their network by disabling security settings. On the other hand, if they lock down their network, they face the ongoing challenge of managing access to their network by known users, and they completely bar access by unknown users. Many default AP configurations are unsecured and therefore the intent of the AP owner to share that connection cannot be simply inferred from by the unsecured nature of an AP. Those connecting to such devices therefore cannot be assured that they are abiding by the intent of the AP owners and may end up subject to usage disputes.

A few solutions have been proposed to resolve this paradox. First, it has been proposed that AP users deploy a "captive portal" to control access to their AP. Here, would-be users of the AP are presented with a web form that authenticates their credentials. Unfortunately, captive portals typically require the user to maintain a separate computer, attached to the AP, to host the portal application. Moreover, such systems are too complicated for the average user to administer. Others approaches propose fee-based systems whereby AP owners effectively "lease" out authenticated access to their AP to other users of the system in exchange for usage credits or other currency. These proposals, however, require a complex set of transactions for every access event and are not conducive to the spirit of an open wireless community.

BRIEF SUMMARY OF THE INVENTION

It is therefore an object of the present invention to provide a cooperative community of wireless local area networks that allows a member of the cooperative to expand his or her wireless communication capabilities while preserving a level of security to the member's WLAN.

According to one aspect version of the present invention, a wireless network community includes a plurality of wireless access points associated with a plurality of owners and a community management system in communication with each of the plurality of wireless access points via a network, such as the Internet. The community management system includes a web server for interacting with the owners and for allowing each of the owners to register as a member of the network community. The community management system also includes an authentication server, and a data store coupled to the web server and to the authentication server. The community management system is configured to allow each registered member to register an associated wireless access point and to control which of the other members is authorized to access the wireless access point.

According to another aspect of the present invention, a community management system in communication with a plurality of wireless access points via an Internet includes a web server for interacting with a plurality of users who own the plurality of wireless access points and for allowing each of the plurality of users to register as a member of a network community. The community management system also includes an authentication server and a data store. The community management system is configured to allow each registered member to register the wireless access point owned by the member and to control which of the other members is authorized to access the wireless access point owned with the member.

In another aspect of the present invention, a method for managing a wireless network community includes registering a plurality of users, some of whom own at least one wireless access point at a central management system, allowing each registered user who owns a wireless access point to set up access policies that indicate which of the other registered users is authorized to access the wireless access point owned by the registered user, and storing the access polices associated with the wireless access point in a data store at the central management system. The central management system allows a registered user to authorize other registered users to access a wireless access point owned by the user and in turn allows the registered user to be authorized to use wireless access points owned by other users, thereby effectively expanding each user's wireless communication capabilities.

BRIEF DESCRIPTION OF SEVERAL VIEWS OF THE DRAWINGS

These features, aspects and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

DETAILED DESCRIPTION OF THE INVENTION

The present invention relates to wireless communication systems, and more particularly to a system and methods for managing a cooperative wireless network community that includes a plurality of wireless access points owned by a plurality of owners. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

According to one aspect of the present invention, a central management system manages a community of WLANs. Some or all of the WLANs can be privately owned, while the remainder can be publicly owned or owned by the central management system. Each private owner is a registered member of the community, and as such, can be granted the privilege of accessing the WLANs of other members. The central management system handles the registration of new members, authentication functions, data collection and other features that will be described below.

Figure 1:
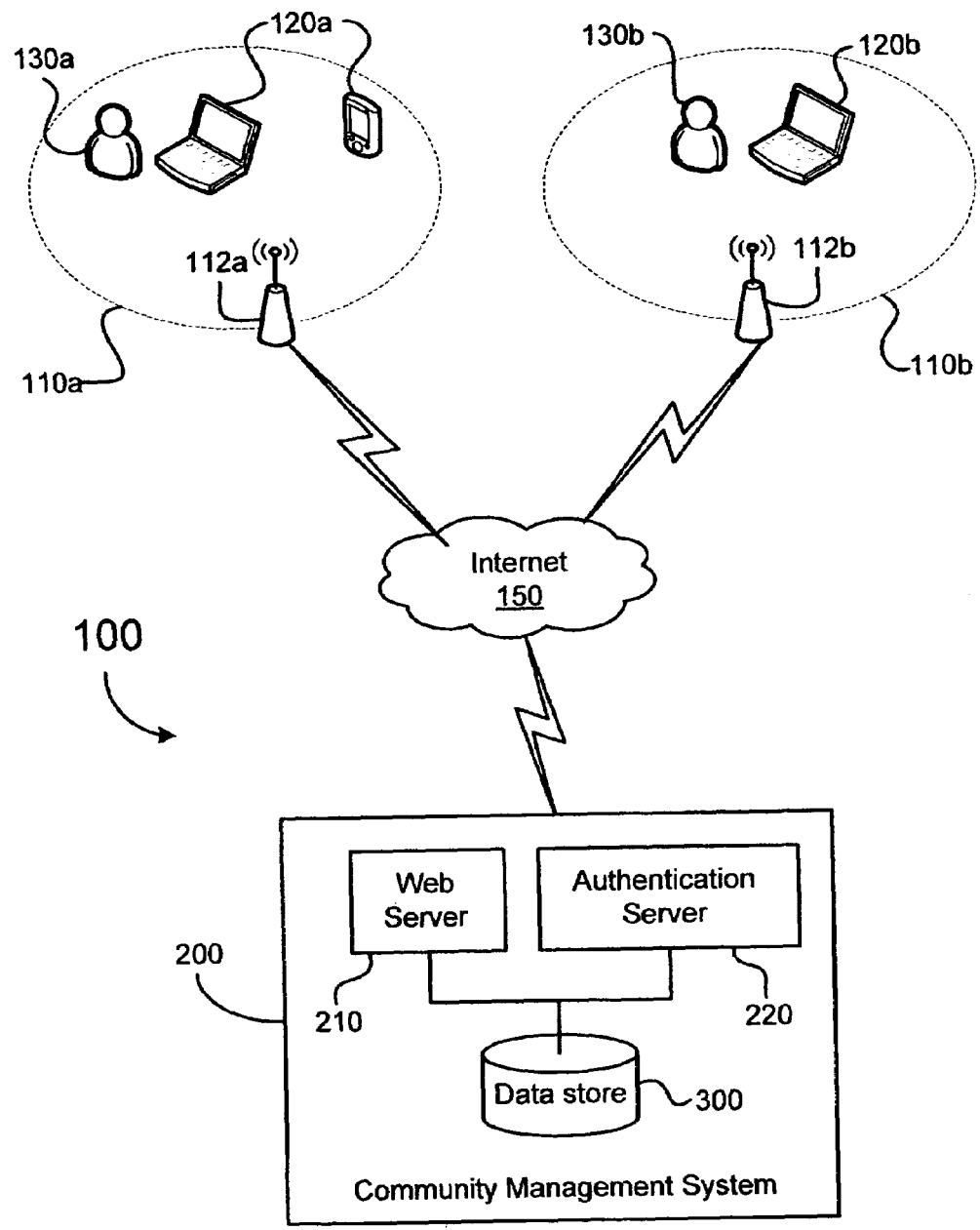
FIG. 1 illustrates an exemplary system diagram of a community of WLANs according to one embodiment of the present invention.

FIG. 1 illustrates an exemplary system diagram of the community of WLANs according to one embodiment of the present invention. The community 100 comprises a plurality of privately owned WLANs 110a, 110b and a central management system 200 in communication with each of the WLANs 110a, 110b via a network, such as the Internet 150. Each WLAN, e.g., 110a, includes at least one wireless access point (AP) 112a that defines the WLAN 110a that allows wireless devices 120a to communicate with one another, to connect to the Internet 150, and to interact with the community management system 200. In one embodiment, each wireless device 120a includes a standards-compliant web browser (not shown) that is used by a member 130a to access the community management system 200. Communication with the management system 200 can occur using HTTP or HTTPS, or an equivalent protocol, depending on the nature of the transaction. All sorts of wireless devices 120a, 120b exist that are suitably equipped, including but not limited to, laptop computers, PDAs, gaming devices, mobile telephones, smartphones, cameras, media players, and computer peripherals.

In a preferred embodiment, each device 120a and the AP 112a support the IEEE 802.11 "Wi-Fi" family of standards and support 802.1x port-based authentication using a version of the Extensible Authentication Protocol (EAP), for example as specified in the Wi-Fi Alliance's "Wireless Protected Access" (WPA) security standard. Accordingly, each device 120a, 120b includes appropriately configured supplicant software and each AP 112a, 112b (authenticator) is configured to designate the community management system 200 as the authentication server. Notably, most consumer grade devices 120a, 120b and standard consumer grade APs 112a, 112b are equipped to support this functionality.

According to a preferred embodiment, the community management system 200 manages, but does not necessarily own, the community of privately owned WLANs 110a, 110b. The management system 200 includes a web server 210 that is configured to execute a dynamic web application (not shown), an authentication server 220, and a data store 300. For simplicity, FIG. 1 shows each of the components 210, 220, 300, in one location. Those skilled in the art will readily appreciate, however, that each component can be integrated into one or the other of the components. Alternatively, each component can be in separate boxes distributed across a network, such as a LAN, WAN, or the Internet 150.

The web server 210 supports a dynamic website comprised of scripted web pages, e.g., Java Server Pages and Apache Struts model/view/controller. Through the scripted web pages, the web server 210 allows members 130a, 130b to control and monitor system functionalities, including, but not limited to, services related to membership management, configuration and testing of WLAN access points 112a, 112b, billing and accounting, and reporting of usage statistics. In one embodiment, this functionality is provided by program code using the Java language with object persistence provided by the Hibernate object relation mapping system. Other example embodiments for either a combined or separate webserver/middleware capability include, but are not limited to, PHP, ASP, C, C#, ASP.Net, Ruby, CGI and Python.

The authentication server 220 is configured to authenticate members 130a, 130b whenever a member, e.g., 130a, requests access to another member's WLAN 110b or to the member's WLAN 110a. The authentication server 220 stores authentication data in the data store 300, which it uses to authenticate the member 130a. In a preferred embodiment, the authentication server 220 uses a remote authentication dial-in user service (RADIUS) based protocol using the IEEE 802.1x standard protocol, but other authentication, authorization, and accounting (AAA) protocols, such as DIAMETER, may be used. In a preferred embodiment, the FreeRADIUS system is used to provide RADIUS services, but any other RADIUS-based servers may be used, including GNURadius, OpenRADIUS, and SteelBelted RADIUS, to name but a few well-known examples.

The data store 300 stores records used by the community management system 200. In a preferred embodiment, the data store 300 is a relational database that manages a plurality of relational tables (not shown). The tables store data, including but not limited to, information about member accounts, WLAN access points, billing records, and system status and usage statistics.

According to a preferred embodiment, a member, e.g., 130b, can register at least one AP 112b with the community management system 200 in order to gain new functionality for managing the member's WLAN 110b, as well as contributing wireless connectivity to other members 130a of the community. The community management system 200 can offer these services for no fee in the spirit of fostering a far reaching wireless network community. Alternatively, a fee can be charged to each member 130a, 130b based on usage or a flat fee. The following figures illustrate processes for joining and using the community 100.

Figure 2:
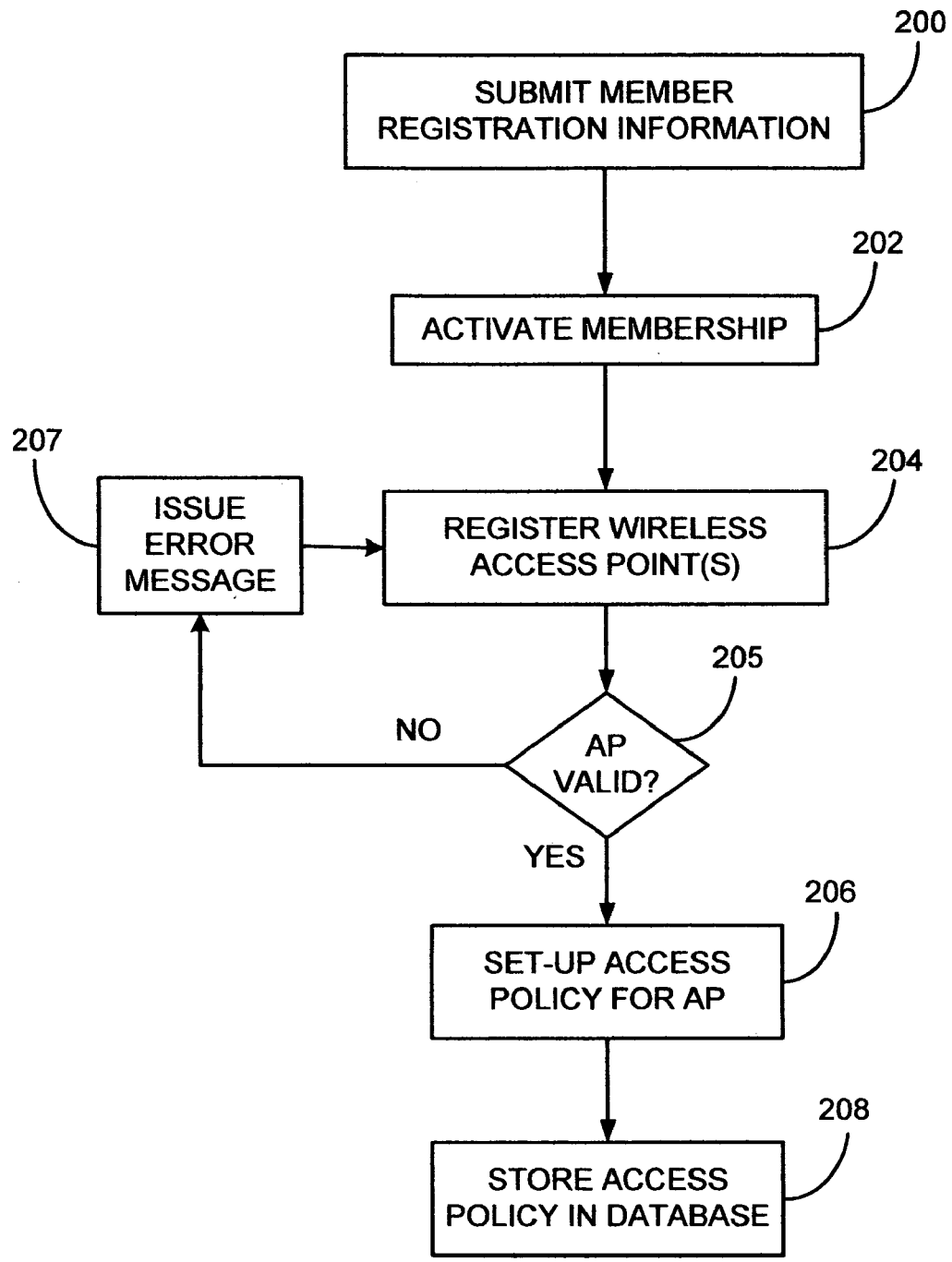
FIG. 2 is a high level flowchart illustrating a process for joining the community 100 according to one embodiment of the present invention.

FIG. 2 is a high level flowchart illustrating a process for joining the community 100 according to one embodiment of the present invention. Referring to FIG. 1 and FIG. 2, the process begins when a prospective member navigates to the community management system's dynamic website supported by the web server 210 and submits member registration information (step 200). Once the proper member registration information is received and verified, the community management system 200 activates the member's membership (step 202).

Figure 3:
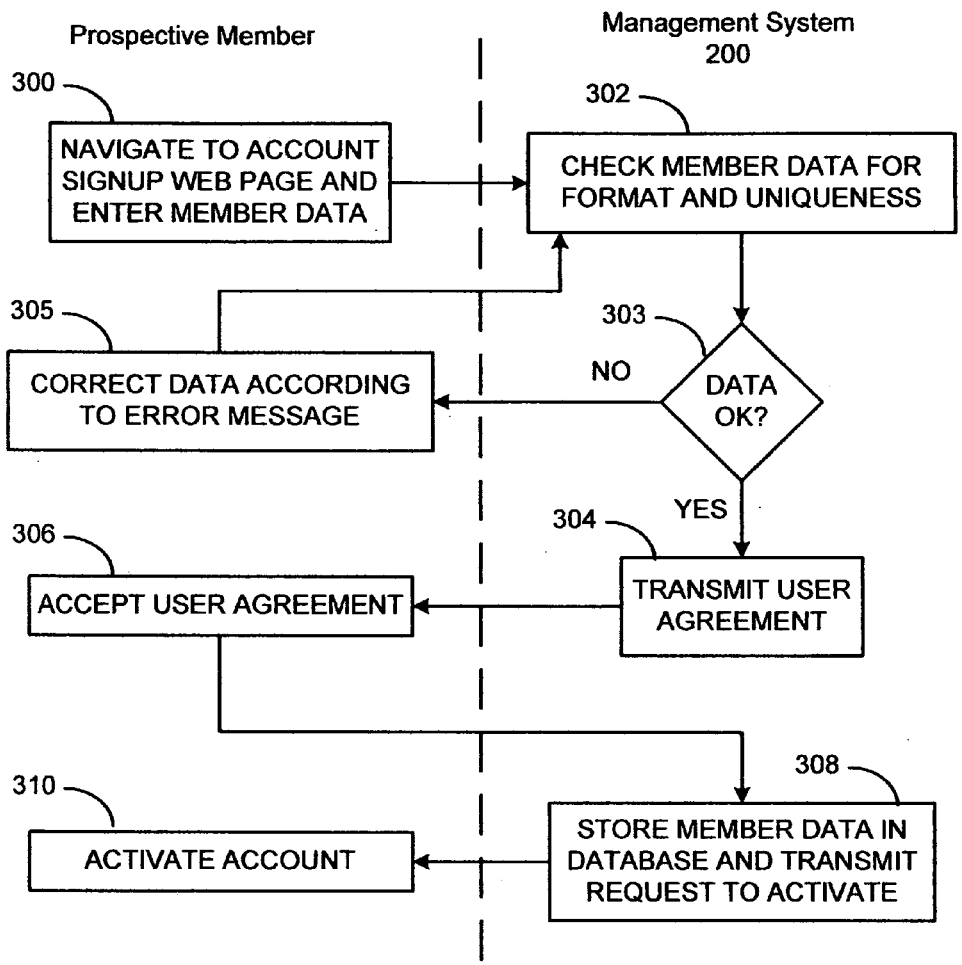
FIG. 3 is a flowchart illustrating a member registration process according to one embodiment of the present invention.

FIG. 3 is a flowchart illustrating a member registration process according to one embodiment of the present invention. The prospective member can initiate the account creation process by navigating to the website and clicking on an account creation link, which takes the prospective member to the account signup page. On the signup page, the prospective member enters member data, including a username, password, e-mail address, physical address, and other personal information into a web form (step 300). Upon submitting the information, the management system 200 checks the format of the information provided, for example, that the username uses the required number and type of characters. The management system 200 also checks the username and e-mail address against usernames and e-mail addresses already in the data store 300 to ensure they are not already in use by any other member of the community 100 (step 302).

In addition, the management system 200 verifies the identity of the prospective member by verifying the validity of the e-mail address. Other sources for verifying the prospective member's identity are available, such as financial information, digital certificates, credit card authorization, mobile device validation, and the like.

If the member data does not satisfy the format and uniqueness requirements (step 303) or if the management system 200 cannot verify the user's identity, the management system 200 returns the prospective member to the signup page, with alerts indicating the deficiencies such that the prospective member can correct the deficiencies (step 305). If the data meets the format and uniqueness requirements, the management system 200 transmits to the prospective member a user agreement with terms and conditions (step 304), with an option to accept or reject the terms.

When the prospective member accepts the user agreement (step 306), the management system 200 stores the member data as a record in the data store 300 and transmits to the prospective member a request to activate the account (step 308). In a preferred embodiment, a flag (e.g., a bit field) is set indicating that the account is in an "inactive" state and an identifier (ID) is associated with the new account. The request to activate includes a hypertext link containing the ID. When the prospective member receives the request, the prospective member can activate the account (310) by, for example, clicking on the link. In response, the management system 200 can update the new account by changing the account status flag from "inactive" to "active."

Referring again to FIG. 2, once the registration information is entered and the membership activated (steps 200, 202), the community management system 200 allows the new member, e.g., 130b, to log-on to the system 200. At this point, the member 130b is allowed to register at least one wireless access point 112b with the community management system 200 (step 204). If the member 130b chooses not to register a wireless access point, e.g., because he does not own one, the member 130b can still enjoy wireless communication privileges provided by the management system 200. For instance, another member 130*a* can explicitly authorize the member 130*b* to use the other member's WLAN 110*a*, thereby expanding the member's 130*b* wireless communication capabilities. Nevertheless, by registering at least one AP 112*b*, the member 130*b* can control access to his or her WLAN 110*b* using 802.1x authentication, which, as stated above, provides a higher level of security. Moreover, in one embodiment, the member 130*b* can be granted roaming privileges.

Figure 4:
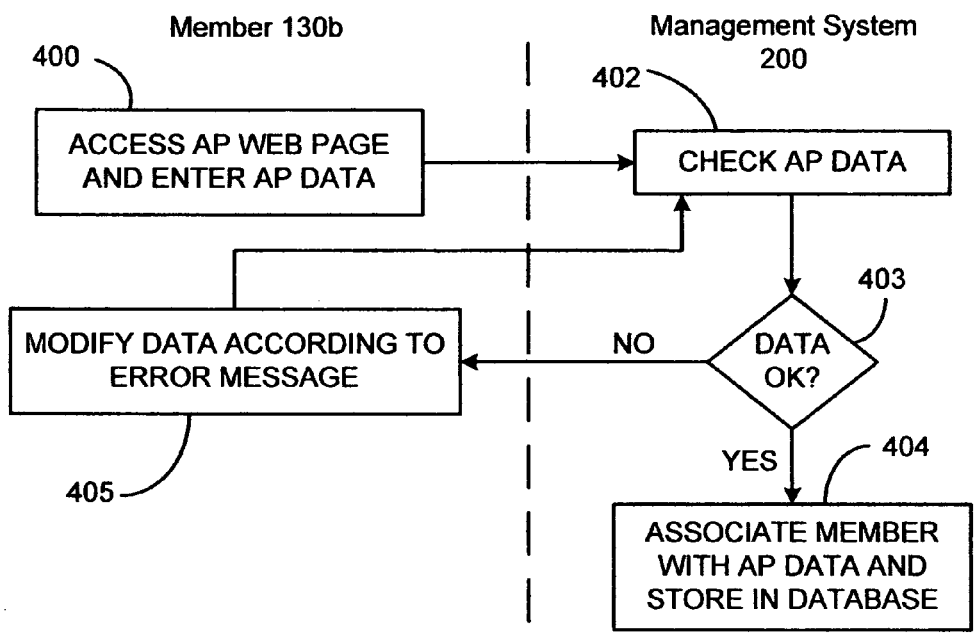
FIG. 4 is a flowchart illustrating a process for registering a wireless access point according to an embodiment of the present invention.

FIG. 4 is a flowchart illustrating a process for registering a wireless access point according to an embodiment of the present invention. From the homepage, the member 130*b* can access an AP registration web page by clicking on an icon to add a new AP. The management system 200 then prompts the member 130*b* to enter data describing the AP using a web form (step 400). In one embodiment, AP data includes the AP's name, make and model, and its geographic location.

In addition, the AP data includes a calling-station ID or wireless media access control (MAC) address of the AP 112*b*. The calling-station ID or wireless MAC address uniquely identifies the AP 112*b*, and can be used by the authentication server 220 to authenticate the AP 112*b*. This functionality will be described in more detail below in relation to how the authentication server 220 authenticates the AP 112*b*. While useful, the AP's wireless MAC address is not necessarily readily known by the member 130*b*. The member 130*b* may not be familiar with the MAC address at all, and even if he is, the member 130*b* may need to search through the AP's service manual and other materials to find the address. Moreover, because the MAC address is typically a sequence of characters and numbers, the member 130*b* can easily make mistakes entering in the MAC address.

In a preferred embodiment, the wireless MAC address of the AP 112*b* can be automatically captured by the management system 200 so that the member 130*b* is not required to enter that data, thereby simplifying the registration process. The member 130*b* can simply check off a "MAC address auto-capture" box in the web form, and continue with the registration process. By checking the "MAC address auto-capture" box, an "auto-configuration" flag associated with the AP data is set. During an AP validation process, described below, the management system 200 detects the flag, and automatically determines the wireless MAC address of the AP 112*b*.

After the member 130*b* has entered the AP data, the community management system 200 checks to ensure that data is entered in a valid format and is new to the system 200, i.e., the AP has not been previously registered (step 402). If the format is not valid or if the AP already exists in the system 200 (step 403), the member 130*b* is given the opportunity to modify the AP data (step 405). Once the AP data is valid (step 403), the member 130*b* is associated with the AP 112*b* and a new record for the AP 112*b* is created in the data store 300. The record stores the AP data, including the AP's location, and make/model information (step 404).

Referring again to FIG. 2, once the member 130*b* has completed registering the AP 112*b*, the management system 200 validates the AP 112*b*. That is, the management system 200 determines whether the member 130*b* has registered a legitimate AP 112*b* (step 205).

Figure 5:
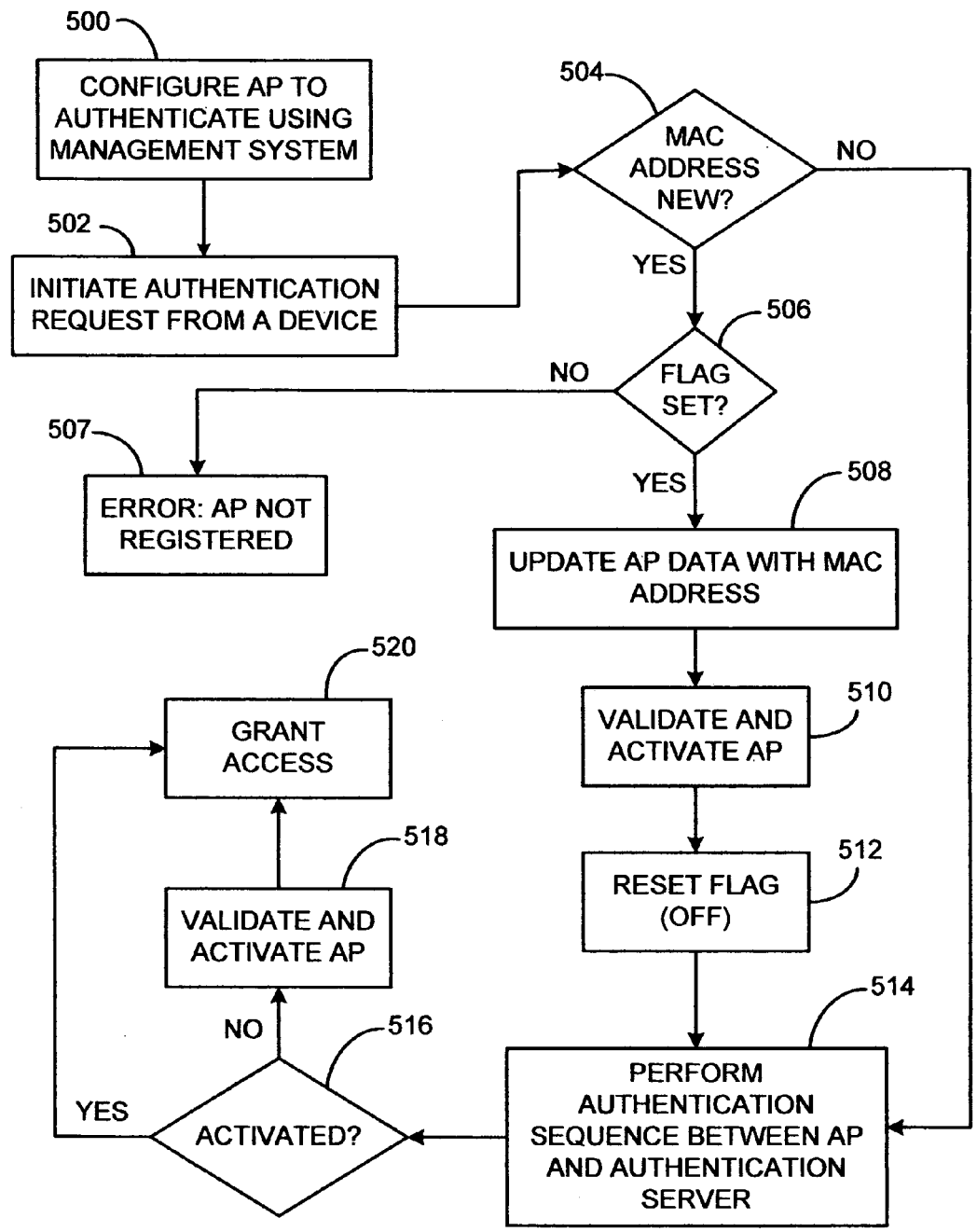
FIG. 5 is a flowchart illustrating a wireless access point validation process according to an embodiment of the present invention.

FIG. 5 is a flowchart illustrating a wireless access point validation process according to an embodiment of the present invention. First, the member 130*b* configures the AP 112*b* to authenticate using the IEEE 802.1x protocol and specifies the appropriate IP address for the authentication server 220 (step 500). In one embodiment, the member 130*b* also sets the service set identifier (SSID) of the AP 112*b* to a value (e.g., a alphanumeric string such as "RADIUZ" or a URL such as "www.radiuz.net") commonly used by all other members 130*a* when configuring their APs 112*a*. Because supplicant profiles are typically associated with SSIDs, maintaining a consistent SSID scheme for all APs 112*a*, 112*b* registered with the management system 200 facilitates roaming across member APs 112*a*, 112*b* by allowing members 130*a*, 130*b* to use a single supplicant profile that includes necessary authentication settings (e.g., 801.1x and EAP methods) to connect to any AP 112*a*, 112*b* registered with the management system 200. The user can also specify a "shared secret", which corresponds to the shared secret used by the authentication server 220. Next, the member 130*b* initiates an 802.1x authentication request from a wireless device 120*b* located in the WLAN 110*b* defined by the AP 112*b* (step 502). The request includes the AP's wireless MAC address.

When the request is received, the management system 200 analyzes the AP's wireless MAC address and determines whether it is new to the system 200, i.e., whether it has been registered previously with the management system 200 (step 504). If the wireless MAC address is not new, e.g., because the member 130*b* has entered the AP's wireless MAC address during the registration process, an 802.1x authentication sequence between the AP 112*b* and the authentication server 220 is performed (step 514). Otherwise, the management system 200 determines whether the "auto-configuration" flag associated with the AP data is set (step 506).

If the flag is not set, it is presumed that the member 130*b* is attempting to validate an AP that has not yet been registered with the management system 200. An error message to that effect can be returned to the member 130*b* (step 507). Otherwise, the AP data associated with the AP 112*b* is updated with the wireless MAC address (508), and the management system 200 validates and activates the AP 112*b* (step 510). In one embodiment, a flag is set indicating the AP's 112*b* "active" status in the record corresponding to the AP 112*b*. Next, the "auto-configuration" flag associated with the AP data is reset to an "off" state (step 512). Thereafter, the 802.1x authentication sequence between the AP 112*b* and the authentication server 220 is performed (step 514).

If the authentication sequence is unsuccessful, an error message is transmitted to the member 130*b* (step 207, FIG. 2). If the authentication sequence is successful, the management system 200 determines whether the AP 112*b* has been activated (step 516), e.g., by checking the AP's "active" flag. If the AP 112*b* has been activated (either in step 510 or previously), access is granted to the AP 112*b* (step 520). Otherwise, e.g., in the case where the member 130*b* has entered the AP's wireless MAC address during the registration process, the management system 200 validates and activates the AP 112*b* (step 518) before granting access to the AP 112*b* (520).

In addition, at this point, the management system 200 can grant the member 130*b* roaming privileges, which allow the member 130*b* to connect to the WLANs 110*a* owned by other members 130*a*. In one embodiment, when roaming privileges are granted, the management system 200 sets a flag in the member's record indicating that the member 130*b* has "roaming" status, and informs the member 130*b* that he or she has achieved roaming status. In this embodiment, a member 130*a*, 130*b* with roaming privileges may access the AP 112*a*, 112*b* of any other member 130*a*, 130*b* who has enabled "cooperative mode" access to their AP 112a, 112b. The "cooperative mode" is described in more detail below.

In one embodiment, where the authentication server 220 is a RADIUS server that utilizes FreeRADIUS to provide authentication, the activation and privilege granting aspects of the validation process are performed by a post authentication module that is added to the FreeRADIUS code base. Other mechanisms to invoke custom code into a RADIUS server's successful authentication sequence may be used, and the scope of the present invention encompasses those mechanisms. However, as stated above, this same functionality could be implemented using any other similarly configured AAA server system.

Referring again to FIG. 2, if the AP 112b is a valid and active, the member 130b is allowed to set-up access policies for each AP 112b registered by the member 130b (step 206). The access policies determine which of the other members 130a in the community are authorized to access the WLAN 110b of the member 130b. The member 130b can choose among a variety of options in which to configure the access policies for his or her WLAN 110b.

For instance, the member 130b can choose to open the WLAN 110b to all members 130a, 130b regardless of whether a member 130a has registered an AP 112a. This access policy is referred to as a "community mode," where all registered members can authenticate to the WLAN 110b. Alternatively, as mentioned above, the member 130b can choose to open the WLAN 110b only to members 130a who have roaming privileges because they have registered at least one AP 112a. This access policy is referred to as a "cooperative mode." In one embodiment, the member 130b can implement an access policy that explicitly authorizes particular members 130a to access the WLAN 110b. This policy is referred to as a "private mode." Alternatively, the member 130b can choose to create authorized user groups that are related to one another. For example, the member 130b can specify that friends of friends can access the WLAN 110b in what is referred to as a "social network" mode. The member 130b can choose to combine any or all of the above described modes, and certainly other modes of defining which members 130a, 130b are authorized to access the WLAN 110b are available.

Once the access policies have been set-up, the access policies are stored in the data store 300 (step 208). Accordingly, whenever any member 130a, 130b, including the member 130b who owns the AP 112b, requests to access the WLAN 110b, the authentication server 220 can retrieve and analyze the access policies associated with the AP 112b to determine whether the requesting member 130a is authorized.

Figure 6:
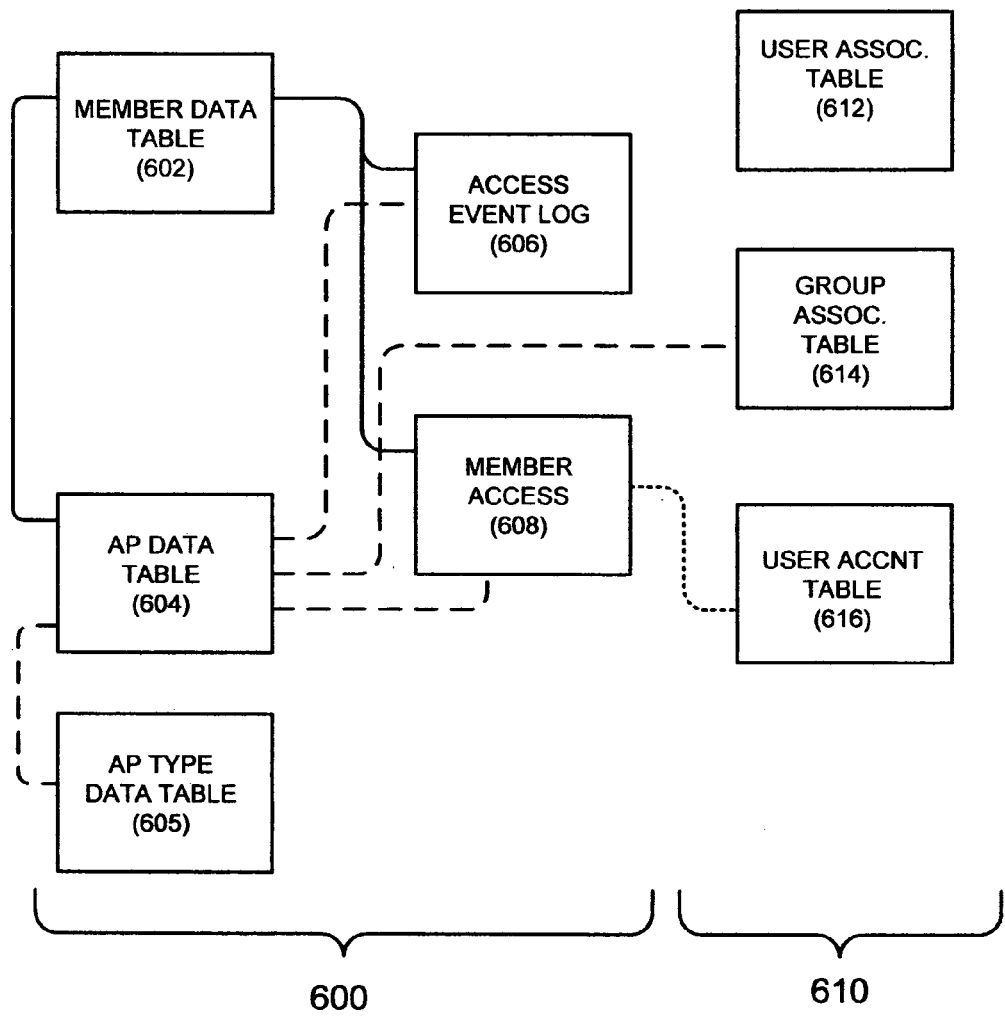
FIG. 6 illustrates a block diagram of the data store and the plurality of tables according to one embodiment of the present invention.

According to a preferred embodiment, the data store 300 includes a plurality of relational tables that store and organize the member data, the AP data and the access policies. FIG. 6 illustrates a block diagram of the data store 300 and the plurality of tables according to one embodiment of the present invention. In a preferred embodiment, the data store 300 includes community management tables 600, such as a member data table 602, an AP data table 604, an AP type table 605, an access event log (606), and a member access table 608. In addition, the data store 300 includes authentication tables 610. In one embodiment, the authentication tables 10 include a user association table 612, a group association table 614 and a user account table 616. The various connectors (solid and dotted lines) shown in FIG. 6 illustrate logical relationships between the various tables. For example, information in the member data table 602 is referenced in the access event log 606, member access table 608 and AP data table 604.

The community management tables 600 store data that is used to support the functionality of the community management system 200. So, for example, the member data table 602 stores data for each member included in the community 100, including but not limited to: status, username, password, name and address information. The AP data table 604 stores all the information related to each WLAN registered with the community 100, including but not limited to: name, type, SSID, MAC address, and physical location. The AP type table 605 stores the make/model information about each registered AP including, but not limited to: the manufacturer, model, description, 802.11x standard, and names and locations of the latest and sufficient firmware versions that enable WPA connectivity.

The member access table 608 stores all the direct associations that have been provided to the management system 200 by the members 130a, 130b to enable other user members to be explicitly authenticated on a members 130b WLAN 110b. That is, the member access table 608 correlates each member 130b with each of the APs 112a, 112b on which the member 130b is explicitly authorized, if any.

The access event log 606 is used to record each successful and unsuccessful authentication event that is made by the management system 200. The information stored includes the member 130b who authenticated or tried to authenticate, the AP 112a on which the member 130b was granted or denied access, a timestamp of the event, and if access was denied, a reason for such denial. The collected information is available to members 130a, 130b and system administrators. By collecting access event information in the access event log 606, a member 130a is able to track who is using his WLAN 110a, as well as who is trying to use his WLAN 110a. In addition, the member 130a can track which WLANs 110b, other than his own, he has been accessing. Moreover, by recording failed attempts to authenticate, a system administrator can assist the member 130a in determining why he is being denied access to a particular WLAN 110a. Using this logged information, the management system 200 can also provide feedback through the web server as to the status of the AP setup and registration process.

In one embodiment, the management system 200 can provide other member services using the information stored in the community management tables 600. For instance, the geographical information related to the APs 112a, 112b can be used to generate a map of an area that indicates where registered APs 112a, 112b are located so that a member 130a can move into the coverage area of one of the APs 112b. In addition, if a member 130b is interested in finding the location of an AP 112a belonging to a particular member 130a, the management system 200 can retrieve information about the member 130a, as well as the location of the member's AP 112a.

The authentication tables 610 are used to support the authentication server 220 capabilities. In one embodiment, the user account table 616 is used to set up user accounts for authentication and also to add entries to provide direct association of members 130a, 130b with access points 112a, 112b. The user 612 and group 614 association tables are used to provide groupings of WLANs 110a, 110b to which groups of members can be authenticated.

In one embodiment, the user association table 612 includes the information that links a member 130a to one or more group names, and the group association table 614 links each group name to one or more APs 112a, 112b. For example, Table A illustrates an entry in the user association table 612 when a member 130b initially registers, but has not yet registered an AP 112b.

TABLE A

| | USER ASSOCIATION TABLE | |
|---|---|---|
| ID | USER NAME | GROUP NAME |
| 15 | Kepler | 0 |

The user association table 612 indicates that the new member 130b, "Kepler" is associated with the group name "zero" (0). The group association table 614, shown below, indicates that no WLANs 110a are associated with the group name "zero."

TABLE B

| | GROUP ASSOCIATION TABLE | |
|---|---|---|
| ID | GROUP NAME | ATTRIBUTE |
| 1 | 0 | NULL |

Accordingly the new member "Kepler" has no roaming privileges, i.e., cannot access a WLAN owned by another member 130a.

While the new member 130b may not be authenticated via the group association table entry, the new member may, however, be authenticated with his or her own AP 112b via a direct association in the user account table 616. Table C illustrates an entry in the user account table 616 after the member 130b, "Kepler," registers an AP 112b having a called-station ID of "0004e29aa10."

TABLE C

| | USER ACCOUNT TABLE | | |
|---|---|---|---|
| ID | USER NAME | ATTRIBUTE | VALUE |
| 5 | Kepler | Called-Station ID | 0004e29aa10 |

In one embodiment, the member 130b Kepler can also be directly associated with other APs 112a by the owners of the other APs 12a. In that case, the user account table 616 would include additional entries for "Kepler" for each of the other APs 112a.

Figure 7:
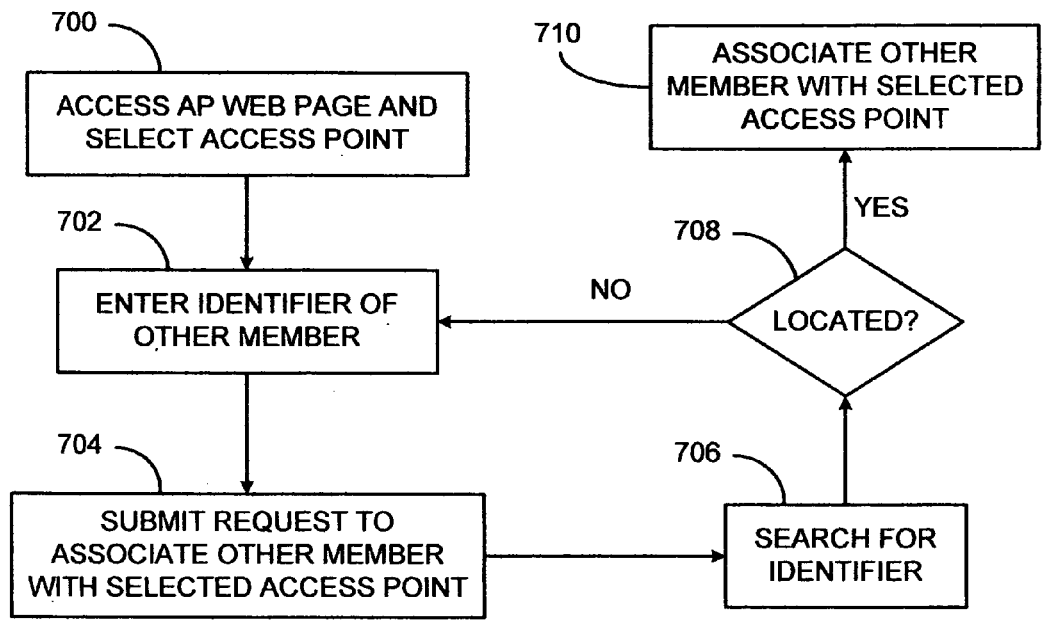
FIG. 7 is a flowchart illustrating a process for associating another member with a member's access point according to one embodiment of the present invention.

FIG. 7 is a flowchart illustrating a process for associating another member with a member's access point according to one embodiment of the present invention. The member 130a begins the process by accessing the AP web page and selecting the access point 112a with which the other member 130b is to be associated (step 700). In one embodiment, the member 130a selects an access point 112a from a list of APs 112a that he or she has already registered with the management system 200. The member 130a then enters an identifier of the other member 130b, e.g., the other member's e-mail address (step 702), and submits a request to associate the other member 130b with the selected access point 112a (step 704). In one embodiment, the member 130a selects, e.g., clicks on, an "associate" button, causing the web page to transmit the request to the management system 200.

In response to receiving the request, the management system 200 searches for the identifier, e.g., the e-mail address (step 706), in the data store 300. If the identifier is not located (step 708), e.g., the e-mail address does not match against a valid member in the data store 300, then an error message is returned and the member 130a is asked to enter the identifier again. If the identifier is located (step 708), the management system 200 associates the other member 130b with the selected access point (step 710).

In one embodiment, the other member 130b can be notified of his or her association with the AP 112a via a suitable message, such as an email message. The message can include a link to a third party mapping provider that references the geographic location of the AP 112a, which when clicked provides a map of that location. Other messages can also be transmitted automatically, such as a confirmation message to the owner/member 130a.

In one embodiment, the same authentication mechanism that associates the owner of an AP with the AP is similarly used for associating other members. Accordingly, for each direct association, a new entry is added to the user account table 616. For example, Table D illustrates an entry in the user account table 616 after the member 130a, "Kepler," associates another member 130b, "Euclid," with Kepler's access point 112a having the called-station ID of "0004e29aa10."

TABLE D

| | USER ACCOUNT TABLE | | |
|---|---|---|---|
| ID | USER NAME | ATTRIBUTE | VALUE |
| 15 | Euclid | Called-Station ID | 0004e29aa10 |

Similarly, a member 130a can disassociate other members 130b from an access point 112a owned by the member 130a via the AP web page. As before, the member 130a selects an AP 112a from the list of AP 112a that the member 130a has already registered with the management system 200, and the management system 200 then displays the list of other members 130b that have been previously associated with the access point 112a. The member 130a then selects the member 130b he wishes to disassociate from the list. In response, the management system 200 disassociates the selected member 130b by deleting the corresponding record from the user account table 616.

Referring again to FIG. 6, in one embodiment, each time a member 130a registers an AP 112a with the management system 200, an entry is added to the group association table 614 as well as to the user accounts table 616. Table E illustrates an entry in the group association table 614 after the member 130a has registered an access point 112a having the called-station ID of "0004e29aa10."

TABLE E

| | GROUP ASSOCIATION TABLE | | |
|---|---|---|---|
| ID | GROUP NAME | ATTRIBUTE | VALUE |
| 10 | 1 | Called-Station ID | 0004e29aa10 |

The group name field is set to "1" and the called-station ID is added as a value. In one embodiment, every registered AP 112a, 112b is associated with the group name "1" (one). Therefore if the member 130a is also associated with the group name "1" (one) in the user association table 612, then the member 130a can roam throughout the community 100.

The management system 200 can also set up arbitrary groupings of WLANs 110a, 110b by adding entries to the group association table 614 with group name fields greater than "1" (one), with the simplest case being one group name value for every WLAN 110a, 110b. It is also possible to associate individual members 130a, 130b to these networked locations and therefore create interconnected overlapping wireless "zones". Hence, a member's access can be discretely controlled as they roam between these zones by creating and deleting records in both the user association table 612 and the group association table 614.

This mechanism facilitates mapping a member's authentication control to his or her implicit trust relationships between other members in their social relationship topology. In a preferred embodiment, creating this member-to-member trust network is facilitated through information stored in the member access table 608. In another embodiment, a separate table of relationships is created where members 130a, 130b can link their accounts to other members without having to first define an access point. The management system 200 then can map these trust relationships to the overlapping wireless "zones". A rules engine can determine which members can access a member's wireless "zone" based on parameters configured by the member and configuring the corresponding entries.

For example, suppose member "Newton" trusts member "Kepler" who in turn trusts member "Euclid," and suppose "Newton" provides an AP and configures an access policy that grants access to the trusted members of his trusted members, e.g., members who have configured associations with members with which "Newton" has configured an association. With this access policy, "Euclid" would be allowed connectivity on "Newton's" wireless access point even though "Newton" and "Euclid" have no direct relationship.

In one embodiment, this access policy is implemented by adding an entry for "Newton's" AP with a unique group name value to the group association table 614. Then an entry for each of "Newton's" trusted members and each of the trusted members of "Newton's" trusted members with a group name value equal to the that of "Newton's" AP is added to the user association table 612. Thus, a record for "Euclid" would be added to the user association table 612 with Euclid's name associated with the unique group name of "Newton's" AP.

In one embodiment where the authentication server is a RADIUS server, the authentication tables 610 are analogous to the FreeRADIUS configuration tables. That is, the user association table 612 is similar to a "usergroup" table, the group association table 614 is similar to a "radgroupcheck" table, and the user account table is similar to a "radcheck" table. Those skilled in the art will readily appreciate that other authentication servers can and do support other similarly configured tables and authentication methods.

Figure 8:
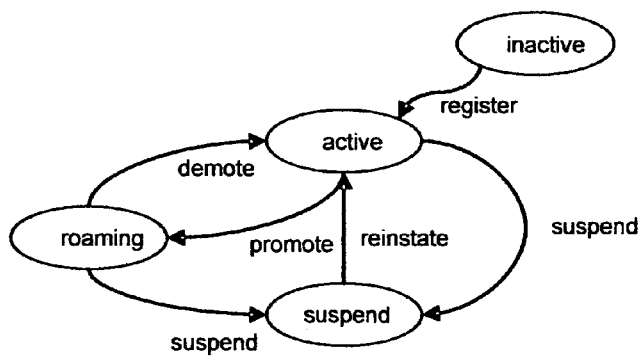
FIG. 8 is a diagram illustrating various states of a member's status according to one embodiment of the present invention.

FIG. 8 is a diagram illustrating various states of a member's status according to one embodiment of the present invention. When the management system 200 first creates an account (step 200, FIG. 2), the member's state is set to "inactive" until the account is activated. In this state, the member cannot use the management system 200 to access the WLAN 110b and cannot be authorized to log onto the website. After the member 130b has successfully activated his or her membership, the account status is changed to "active" and now the management system 200 can be used for accessing the website and for being granted access to the WLANs 110a, 110b through direct or indirect association on other member's APs 112a. When a member 130b satisfies the requirements for network roaming, the system 200 automatically promotes the account to enable global roaming across the community 100.

The system 200 can be automatically or manually configured to demote the member's account to a non-roaming active state. Reasons for both automatic and manual demotion include, but are not limited to, the member's deletion of networks, and/or inactivity on registered networks. Both the roaming and the active states can be manually set to a suspended mode that prevents the member 130b from accessing the community network 100. Although a suspended member may not access the community network 100, he or she is granted access to the account where information is provided to notify her of her current status.

Figure 9:
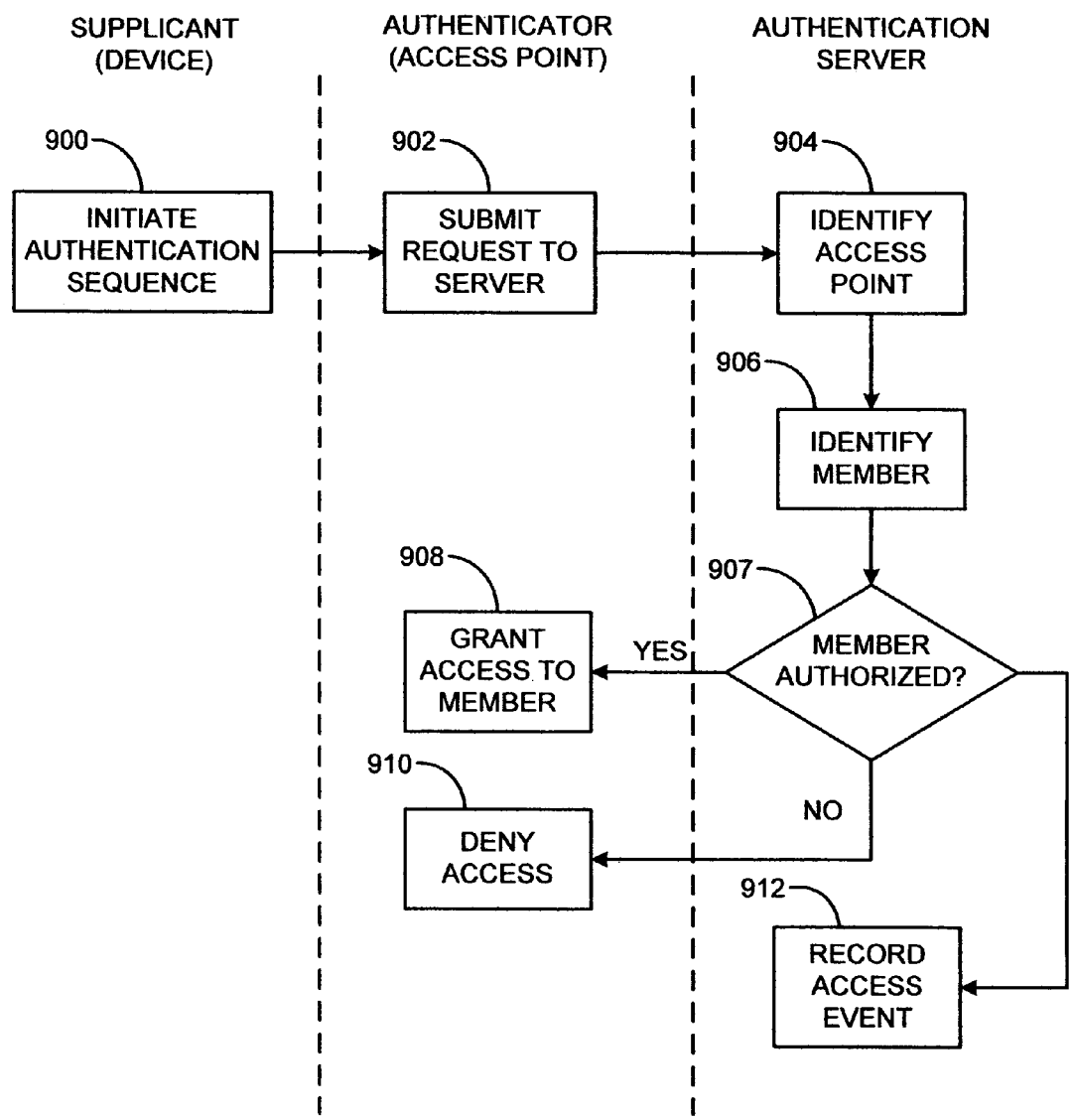
FIG. 9 is a flowchart illustrating a process for authenticating a member against a registered AP according to one embodiment of the present invention.

FIG. 9 is a flowchart illustrating a process for authenticating a member against a registered AP according to one embodiment of the present invention. Referring to FIG. 1 and FIG. 9, a member 130a who wishes to access the Internet 150 via another member's AP 112b, begins by using her wireless device 120a to initiate an authentication sequence against the AP 112b (step 900). In one embodiment, member 130a provides her username and password in a request to access the AP 112b. The wireless device 120a can be any wireless communication device that is configured to access the Internet, such as a laptop computer, PDA, phone or camera.

The wireless device 120a is preferably configured to authenticate using the standard IEEE 802.1x protocol, which provides a high level of security. The wireless device 120a includes a "supplicant" that communicates with the "authenticator," i.e., the AP 112b, which in turn communicates with the authentication server 220. The communication protocol used between the supplicant/device 120a and authenticator/AP 112b, and between the supplicant/device 120a and the authentication server 220 (via the authenticator/AP 112b) is typically some form of the Extensible Authentication Protocol (EAP). In one embodiment, a Protected EAP (PEAP) protocol is used to transmit authorization requests to the authentication server 220 via the AP 112b, although other EAP based protocols can also be utilized, such as LEAP, EAP-TLS, and EAP-TTLS. With this authentication configuration, the member 130a is not required to manage pre-shared keys in order to authenticate against the AP 112b. Moreover, mutual authentication for both the member 130a and the AP 112b is provided in a secure manner.

The authenticator/AP 112b typically communicates with the authentication server 220 using the RADIUS protocol, although other communication protocols can be used for other types of authentication servers 220. Typically, each AP 112a is associated with a unique shared secret, which is used to encrypt messages between the server 220 and the AP 112a. A disadvantage of associating the shared secret with the AP 112a is that during an access request, the FreeRADIUS server is required to look up the shared secret for the requesting AP 112a. That is, the RADIUS server 220 must search the data store 300 to retrieve the shared secret that matches an IP address corresponding to a requesting AP 112a. Accessing the data store 300 is time-consuming and costly.

According to a preferred embodiment, the authentication server 220 bypasses this procedure and enforces a common shared secret for all registered APs 112a, 112b in the community. In one embodiment, modifications to both the FreeRADIUS server code and configuration files instruct the authentication (RADIUS) server 220 to index the common shared secret for the network community 100. Examples of such modifications are provided below:

Modified configuration file:

```
client 127.0.0.1 {

# The shared secret used to "encrypt" and "sign" packets between
# the AP and FreeRADIUS. You MUST change this secret from
# the default, otherwise it's not a secret any more!

# The secret can be any string, up to 32 characters in length.
    secret = radiuz

# The short name is used as an alias for the fully qualified
# domain name, or the IP address.

    shortname = localhost
    nastype = other
}
```

Modified server code:

```
 *      Find a client in the RADCLIENTS list.
 */
RADCLIENT *client_find(uint32_t ipaddr)
{
        RADCLIENT *cl;
        RADCLIENT *match = NULL;
        for (cl = mainconfig.clients; cl; cl = cl->next) {
                return cl;
        }
        return match;
}
```

Equivalent system functionality could be implemented by similarly configuring any other AAA server and/or by managing separate shared secrets for each registered access point in the system.

Once the member 130a initiates the authentication sequence via her device 120a, the AP 112b submits the request, which includes the member's username and password, to the authentication server 220 (step 902). When the authentication server 220 receives the request, it identifies the AP 112b (step 904).

Typically, because the IEEE 802.1x standard is a port-based protocol, the authentication server 220, e.g., RADIUS server, identifies the AP 112b by its IP address. Nevertheless, because many APs are connected to consumer-grade broadband Internet networks, the APs are assigned dynamic IP addresses, which then cannot be used to identify the AP. To address this complication, in a preferred embodiment, the authentication server 220 identifies the AP 112b by its called-station ID or wireless MAC address. As stated above, the MAC address is a unique identifier associated with the AP 112b during product manufacturing. Therefore it can be used to identify the AP 112b.

Figure 10:
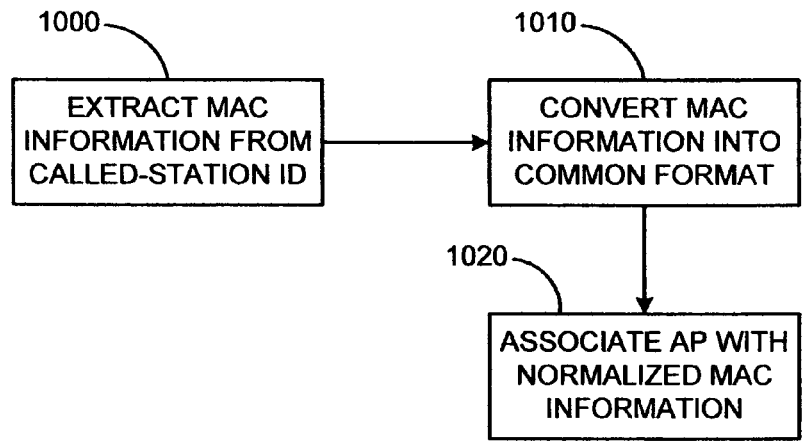
FIG. 10 is a flowchart illustrating one process for normalizing the MAC address according to one embodiment of the present invention.

In a preferred embodiment, because different manufacturers utilize different MAC address formats, the AP's MAC address is normalized to a common format that can be interpreted by the authentication server 220. FIG. 10 is a flowchart illustrating one process for normalizing the MAC address according to one embodiment of the present invention. The process takes the called-station ID for an AP 112b and extracts the MAC information (step 1000). For example if the Called-Station-ID value for an AP is "a1-B2-c3-D4-e5:www.radiuz.net," the process extracts each character until it encounters a terminating delimiter, e.g. the colon, where it terminates the extraction process. Once the MAC information is extracted, the process converts it into a common format (step 1010). For example, the process can ignore separators, e.g., "-", and change upper case letters to their lower case forms. In this example, the resultant normalized MAC address string would be "a1b2c3d4e5". The AP is then associated with the normalized MAC information (step 1020).

In one embodiment, the MAC address normalization process can be implemented by a modification to the rlm_checkval.c file utilized by the FreeRADIUS server. For example, the modification, which can be implemented in C code, can include the code:

```
void clean_mac_string(char* mac,char* ret){
    int j=0;
    int i=0;
    for (i=0;((i<strlen(mac))&&(mac[i]!=':'));i++){
        if (mac[i]!='-'){
            if ((mac[i]>64)&&(mac[i]<91)){
                ret[j] = (char)(mac[i] + 32);
            }else{
                ret[j] = mac[i];
            }
            j++;
        }
    }
}
```

Referring again to FIG. 9, once the authentication server 220 has identified the AP 112b via its normalized MAC address (904), the authentication server 220 identifies the member 130a using the members username and password (step 906). In one embodiment, the authentication server 220 compares the username and password against records in the member data store 300. If the username and/or password do not match any records, the authentication server 220 rejects the request.

Following successful validation of the username and password, the authentication server 220 determines whether the member 130a is authorized to access the AP 112b (step 907). In one embodiment, the authentication server 220 can check the user account table 616 to determine whether the member 130a has been explicitly associated (e.g., using the process described in FIG. 7) with the AP 112b. If the member 130a has not been directly associated with the AP 112b, the authentication server 220 can then check the user association table 612 and the group association table 614 to determine if the AP 112b is associated with a group name that is associated with the member 130a.

If the AP 112b has been explicitly associated with the member 130a or has been associated with any group names that include the member 130a, the authentication server 220 returns an authentication and authorized message and the AP 112b grants the members request for access (step 908). Otherwise, if an association, direct or indirect, between the member 130a and AP 112b is lacking, the member 130a is not authorized to access the AP 112b and the request is denied (step 910).

Following all authentication attempts, whether successful or unsuccessful, the authentication server 220 records the access event (step 912), e.g., in the access event log 606 (FIG. 6), to enable tracking and reporting functionality. In one embodiment, the authentication server 220 records an identifier of the member 130a, the AP 112b against which the member 130a successfully or unsuccessfully has been authenticated, and the time of successful or unsuccessful authentication. Other related information can also be recorded in the access event log 606, such as the wireless MAC address of the AP 112*b* and a MAC address of the wireless device 102*a*. This information can be retrieved by a member 130*a*, 130*b* in order to track who is using or trying to use the member's WLAN 110*a*, 110*b*. In addition, this information can be used by a system administrator to assist a member 130*a*, 130*b* who is having difficulties authenticating against an AP 112*a*, 112*b*, and/or to determine use fees.

In the context of a RADIUS server, the RADIUS protocol supports detailed accounting information to be returned to the RADIUS server by the authenticator/AP. Nevertheless, because typical consumer grade APs do not include this functionality, the RADIUS server must rely on the authentication request to track usage information. In one embodiment, a modification to the FreeRADIUS sql.conf file allows the server to log events to the data store 300. For example, the modification, which can be implemented in C code, can include the code:

```
postauth_query = "INSERT INTO accessevent
(member_id,accesspoint_id,datetime) SELECT
member.member_id,accesspoint.accesspoint_id,NOW( ) from
member,accesspoint WHERE username='%{User-Name}' AND
apmac=LOWER(REPLACE(LEFT(CONCAT('%{Called-Station-
Id}',':'),LOCATE(':',CONCAT('%{Called-Station-Id}',':'))-1),'-',''))"
```

Equivalent logging functionality could be implemented in any other AAA system and/or data storage system.

According to aspects of the present invention, a community management system supports a cooperative community of WLANs where members of the cooperative community can expand their wireless communication capabilities while preserving a level of security in each of their respective WLANs. The community management system allows each member to manage access to his or her WLAN using a web-based application, and to secure the WLAN using the IEEE 802.1x standard protocol, which lifts the burden of managing pre-shared keys from the member's shoulders. In addition, the community management system allows each member to gain access to the WLANs of other members, if authorized.

The following additional advantages are provided:
ease of use by members;
mutual authentication for both the member and the access point, i.e., members are assured of the authenticity of the WLAN to which they will connect and the access point is assured of the identity of the accessing member;
validation of new member identities to provide trust among members of the service;
association of a member's personal information to his or her WLAN, allowing other members to locate WLANs according to information such as the AP's location or members username;
registration of one or more WLANs with a central authentication service without any assistance from a central system administrator;
ability to accommodate WLANs in a heterogenous network environment, where many WLANs may be assigned dynamic IP addresses;
centralized authentication and security without the need for a unique "shared secret";
ability to accommodate a wide variety of WLAN equipment, which may use inconsistent machine identification techniques;
ability to authorize access to an AP according to specified business rules, such as "community mode," "cooperative mode," "private mode," and "social network mode";
ability to manage provided access to APs from a central website by using any Internet connection and a web browser;
logging of member access events in a central data store despite the lack of RADIUS accounting capabilities in consumer-grade WLAN equipment; and
reporting of access event information to system users via a web interface.

The present invention has been described in accordance with the embodiments shown, and one of ordinary skill in the art will readily recognize that there could be variations to the embodiments. For example, the processes described above are implemented using computer software embodied in the various system components. In one embodiment, the processes are implemented using Java, Java Server Page (JSP), 'C' and scripted code, with connections to an SQL database and the FreeRADIUS authentication system. The system, however, can be implemented using any equivalent computer languages, data storage, and AAA technologies. For example, other RADIUS-based servers can be used, e.g., GNURadius, OpenRADIUS, SteelBelted RADIUS, and Microsoft's IAS, along with all associated configuration files and instructions required by the alternative RADIUS server. Any variations would be within the spirit and scope of the present invention.

We claim:

1. A wireless network community comprising:
a plurality of wireless access points associated with a plurality of owners; and
a community management system in communication with each of the plurality of wireless access points via an Internet, the community management system comprising:
a web server for interacting with the plurality of owners and for allowing each of the plurality of owners to register as a member of the network community;
an authentication server; and
a data store coupled to the web server and to the authentication server;
wherein the community management system is configured to allow each registered member of the plurality of members to register an associated wireless access point and to control which of the other members is authorized to access the wireless access point associated with the member.

2. The wireless network community of claim 1 wherein each registered member is allowed to create at least one access policy that indicates who is authorized to access the wireless access point associated with the member, and wherein the at least one access policy is stored in the data store.

3. The wireless network community of claim 2 further comprising at least one registered member who does not own a wireless access point, and wherein the at least one access policy allows all other registered members and the at least one registered member who does not own a wireless access point to access the wireless access point.

4. The wireless network community of claim 2 wherein the at least one access policy authorizes only members that have registered wireless access points.

5. The wireless network community of claim 2 wherein the at least one access policy directly authorizes at least one other member to access the wireless access point.

6. The wireless network community of claim 2 wherein the at least one access policy indirectly authorizes at least one other member to access the wireless access point because the at least one other member is associated with a group and the group is authorized by the member to access the wireless access point.

7. The wireless network community of claim 2 wherein in response to receiving a request by a member to access a registered wireless access point, the authentication server determines whether the requesting member is authorized to access the wireless access point based on the at least one access policy for the wireless access point.

8. The wireless network community of claim 7 wherein the authentication server records and stores in the data store information related to the request to access the wireless access point, wherein the related information includes an identifier of the requesting member, an identifier of the wireless access point, and a timestamp.

9. The wireless network community of claim 1 wherein the authentication server uses an IEEE 802.1x authentication protocol.

10. The wireless network community of claim 9 wherein in response to receiving a request by a member to authenticate against a wireless access point, the authentication server identifies the wireless access point by a wireless media access control (MAC) address associated with the wireless access point.

11. The wireless network community of claim 10 wherein the wireless MAC address comprises normalized MAC address information.

12. The wireless network community of claim 1 wherein each of the plurality of wireless access points is set to a common service set identifier such that a common supplicant profile is used by each registered member.

13. A community management system in communication with a plurality of wireless access points via an Internet, wherein each wireless access pointed is owned by a user, the community management system comprising:
  a web server for interacting with the plurality of users and for allowing each of the plurality of users to register as a member of a network community;
  an authentication server; and
  a data store coupled to the web server and to the authentication server;
  wherein the community management system is configured to allow each registered member to register the wireless access point owned by the member and to control which of the other members is authorized to access the wireless access point owned with the member.

14. A method for managing a wireless network community, the method comprising:
  registering a plurality of users at a central management system, wherein at least one registered user owns at least one wireless access point;
  allowing the at least one registered user to set up access policies that indicate which of the other registered users is authorized to access a wireless access point owned by the at least one registered user; and
  storing the access polices associated with the wireless access point in a data storage at the central management system;
  wherein the central management system allows the at least one registered user to authorize other registered users to access the wireless access point owned by the user and in turn allows the at least one registered user to be authorized to use wireless access points owned by other of the at least one registered users, thereby effectively expanding each user's wireless communication capabilities.

15. The method according to claim 14 wherein allowing the at least one registered user to set up access policies includes allowing the at least one registered user to create an access policy that grants access to the wireless access point to all other registered users.

16. The method according to claim 14 wherein allowing the at least one registered user to set up access policies includes allowing the at least one registered user to create an access policy that grants access to the wireless access point only to other registered users that have also registered their respective wireless access points.

17. The method according to claim 14 wherein allowing the at least one registered user to set up access policies includes allowing the at least one registered user to create an access policy that directly authorizes at least one other registered user to access the wireless access point.

18. The method according to claim 14 wherein allowing the at least one registered user to set up access policies includes allowing the at least one registered user to create an access policy that authorizes a group to access the wireless access point, wherein at least one other registered user is associated with the group.

19. The method according to claim 14 further comprising:
  receiving by the central management system a request by a registered user to access a wireless access point; and
  in response to receiving the request, determining whether the requesting user is authorized to access the wireless access point based on the access policies associated with the wireless access point.

20. The method according to claim 19 further comprising:
  collecting information related to the request to access the wireless access point, wherein the related information includes an identifier of the requesting user, an identifier of the wireless access point, and a timestamp; and
  storing the information related to the request at the central management system.

21. The method according to claim 14 further comprising:
  receiving by the central management system a request by a registered user to access a wireless access point; and
  authenticating the registered user and the wireless access point using an IEEE 802.1x authentication protocol.

22. The method according to claim 14 wherein registering a user includes:
  collecting data related to the at least one wireless access point owned by the user, wherein the data includes a wireless media access control (MAC) address associated with each of the at least one wireless access point; and
  normalizing each wireless MAC address to a common format.

23. The method according to claim 22 further comprising:
  receiving by the central management system a request by a registered user to access a wireless access point;
  identifying the wireless access point by the normalized wireless MAC address associated with the wireless access point; and
  authenticating the registered user and the wireless access point using an IEEE 802.1x authentication protocol.

24. The method according to claim 14 further comprising:
  for each of the at least one wireless access points, setting a service set identifier to a common value such that a common supplicant profile is used by each registered owner.

* * * * *